US011301717B2

(12) United States Patent
Hwang et al.

(10) Patent No.: US 11,301,717 B2
(45) Date of Patent: Apr. 12, 2022

(54) METHOD AND APPARATUS FOR MEASURING INTERACTION FORCE BASED ON SEQUENTIAL IMAGES USING ATTENTION NETWORK

(71) Applicants: AJOU UNIVERSITY INDUSTRY-ACADEMIC COOPERATION FOUNDATION, Suwon-si (KR); Dongguk University Industry-Academic Cooperation Foundation, Seoul (KR)

(72) Inventors: Won Jun Hwang, Seoul (KR); Ho Chul Sin, Yongin-si (KR); Dong Yi Kim, Suwon-si (KR); Soo Chul Lim, Seoul (KR); Dae Kwan Ko, Seoul (KR)

(73) Assignees: AJOU UNIVERSITY INDUSTRY-ACADEMIC COOPERATION FOUNDATION, Suwon-si (KR); Dongguk University Industry-Academic Cooperation Foundation, Seoul (KR)

( * ) Notice: Subject to any disclaimer, the term of this patent is extended or adjusted under 35 U.S.C. 154(b) by 145 days.

(21) Appl. No.: 16/716,881

(22) Filed: Dec. 17, 2019

(65) Prior Publication Data
US 2020/0380297 A1    Dec. 3, 2020

(30) Foreign Application Priority Data
May 29, 2019 (KR) .................. 10-2019-0063469

(51) Int. Cl.
*G06K 9/62* (2022.01)
*G06V 10/75* (2022.01)

(52) U.S. Cl.
CPC .......... *G06K 9/6232* (2013.01); *G06V 10/75* (2022.01)

(58) Field of Classification Search
None
See application file for complete search history.

(56) References Cited

U.S. PATENT DOCUMENTS

| 2018/0096078 | A1* | 4/2018 | Leeman-Munk ... G06F 16/9024 |
| 2018/0189229 | A1* | 7/2018 | Desoli .................... G06N 20/00 |
| 2018/0189642 | A1* | 7/2018 | Boesch ................. G06F 30/34 |
| 2019/0266784 | A1* | 8/2019 | Singh ................... G06K 9/6201 |

(Continued)

OTHER PUBLICATIONS

Yang Gao et al., "Deep Learning for Tactile Understanding From Visual and Haptic Data", IEEE International Conference on Robotics and Automation (ICRA), Stockholm, Sweden, May 2016, pp. 536-543.

(Continued)

*Primary Examiner* — Tahmina N Ansari
(74) *Attorney, Agent, or Firm* — Sughrue Mion, PLLC

(57) ABSTRACT

A method of measuring an interaction force includes: generating feature maps corresponding to a plurality of sequential images; generating pooling maps respectively corresponding to feature map groups including a predetermined number of feature maps among the feature maps; generating attention maps corresponding to the pooling maps; and sequentially receiving feature maps modified based on the attention maps and outputting interaction force information.

16 Claims, 6 Drawing Sheets

(56) References Cited

U.S. PATENT DOCUMENTS

2020/0380297 A1* 12/2020 Hwang .............. G06K 9/6232
2021/0089316 A1* 3/2021 Rash ................... G06F 17/153

OTHER PUBLICATIONS

Sanghyun Woo et al., "CBAM: Convolutional Block Attention Module", arXiv:1807.06521v2, Jul. 18, 2018.
Communication dated Nov. 18, 2020, issued by the Korean Patent Office in counterpart Korean Patent Application No. 10-2019-0063469.
Karen Simonyan, et al., "Very Deep Convolutional Networks for Large-Scale Image Recognition", International Conference on Learning Representations, 2015, 14 pages.

* cited by examiner

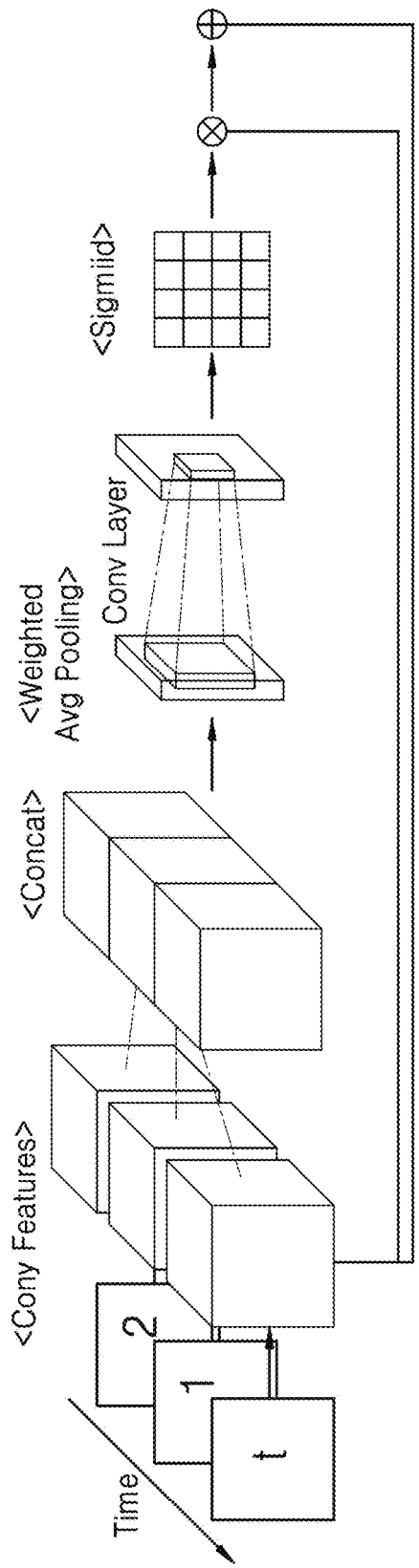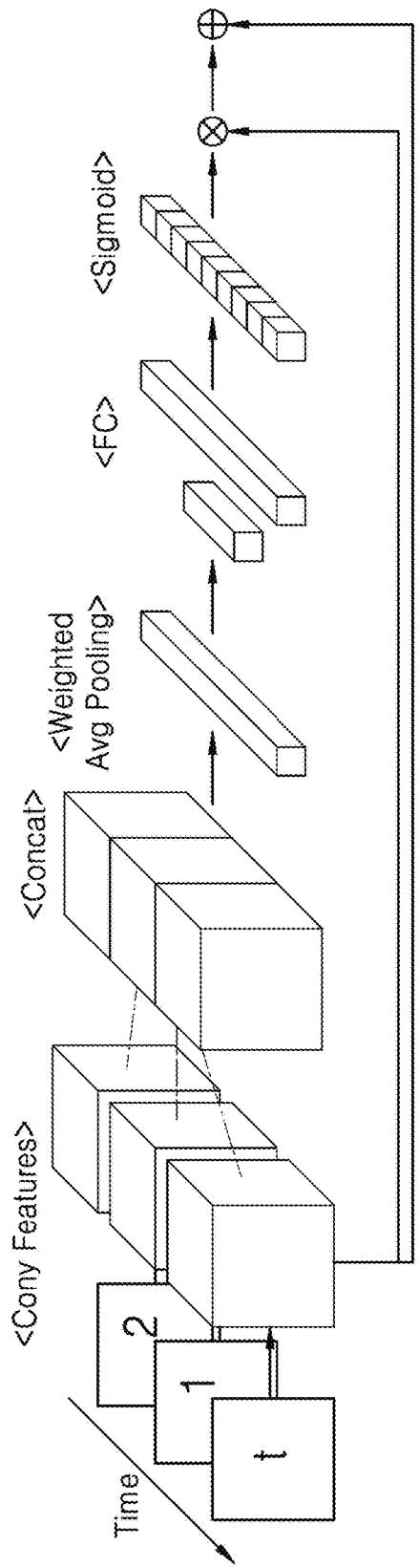

METHOD AND APPARATUS FOR MEASURING INTERACTION FORCE BASED ON SEQUENTIAL IMAGES USING ATTENTION NETWORK

CROSS-REFERENCE TO RELATED APPLICATION

This application claims the benefit of Korean Patent Application No. 10-2019-0063469, filed on May 29, 2019, in the Korean Intellectual Property Office, the disclosures of which is incorporated herein in its entirety by reference.

BACKGROUND

1. Field

The disclosure relates to a method and apparatus for measuring interaction force between objects, and more particularly, to a method and apparatus for measuring interaction force between objects based on sequential images without a haptic sensor.

2. Description of the Related Art

Among human five senses, tactile sensation is an important perceptional modality for understanding the relationship between humans and their surroundings. The tactile sensation provides complementary information for realizing the surrounding environment. From this point of view, the tactile sensation has long been a major issue in the field of robotics and haptic sensing.

The main physical property for interacting with objects and grasping objects is an interaction force. In more detail, when a robot's hand tries to catch an object, a touch-based haptic sensor may measure an interaction force between the robot's hand and the object. By measuring the interaction force through the haptic sensor, the probability of the robot's hand successfully grabbing an object may be improved, and an accurate operation of the robot's hand may be achieved.

In the case of humans, visual information recognized by the eye together with the touch is used when catching an object. Through the visual information, humans perceive the shape, appearance, and texture of objects and infer the touch in the light of past experiences. That is, the human brain employs a shared model of objects through various sensory modalities (e.g., visual sensation or tactile sensation), and knowledge of the object may be converted from one sensation to another sensation.

In view of knowledge conversion from visual sensation to tactile sensation, a visual sensor-based method of simulating tactile sensation may be proposed. When a human tries to touch an object, the human may remember the feeling of the object from previous experience. In more detail, if a human knows the object, the human may predict how the appearance of the object will be changed by the finger, and may also predict an interaction force between the object and the finger.

Although a touch-based haptic sensor may be used to measure the interaction force, its life is limited in that it is touch-based. Accordingly, there is a need for a method of measuring an interaction force using only a non-touch based visual sensor.

SUMMARY

Provided is measuring an interaction force between objects with only sequential images.

In addition, provided is accurately measuring an interaction force only in a salient region of sequential images through an attention network.

Furthermore, provided is effective control of a robot by measuring an interaction force generated when the robot interacts with an object.

The inventive concept is not limited to the above objectives, but other objectives not described herein may be clearly understood by those of ordinary skilled in the art from descriptions below.

According to an aspect of the inventive concept, a method of measuring an interaction force, the method includes: generating feature maps corresponding to a plurality of sequential images; generating pooling maps respectively corresponding to feature map groups including a predetermined number of feature maps among the feature maps; generating attention maps corresponding to the pooling maps; and sequentially receiving feature maps modified based on the attention maps and outputting interaction force information.

According to an exemplary embodiment, the pooling maps may include a first type of pooling maps and a second type of pooling maps respectively corresponding to the feature map groups, and the attention maps may include a first type of attention maps respectively corresponding to the first type of pooling maps and a second type of attention maps respectively corresponding to the second type of pooling maps, wherein the outputting of the interaction force information may include: receiving at least one of feature maps modified based on the first type of attention maps, feature maps modified based on the second type of attention maps, and a concatenation result of the feature maps modified based on the first type of attention maps and the feature maps modified based on the second type of attention maps, and outputting the interaction force information.

According to an exemplary embodiment, the first type of pooling map may be generated by performing a convolution operation on a predetermined number of concatenated feature maps with a filter kernel of a predetermined size for each channel, and then linearly combining results of the convolution operation, and the second type of pooling map may be generated by relocating a predetermined number of concatenated feature maps based on a spatial location, performing a convolution operation on the relocated feature maps with a filter kernel of a predetermined size for each channel, and then linearly combining results of the convolution operation.

According to an exemplary embodiment, after the attention maps and corresponding feature maps are multiplied, the feature maps may be modified by adding feature maps to the multiplied result.

According to an exemplary embodiment, the outputting of the interaction force information may include: inputting the modified feature maps to a recurrent neural network (RNN) in order; and obtaining the interaction force information output from a fully connected layer (FCL) by inputting an output value of the RNN to the FCL.

According to an exemplary embodiment, the RNN may receive the modified feature maps sequentially from a first feature map to the last feature map and output a first output value corresponding thereto, and receive the modified feature maps sequentially from the last feature map to the first feature map and output a second output value corresponding thereto, and the FCL may receive an average value of the first output value and the second output value.

According to an exemplary embodiment, the predetermined number of feature maps may include a feature map corresponding to a $t^{th}$ image and n−1 feature maps corresponding to n−1 images before the $t^{th}$ image.

According to an exemplary embodiment, the method may further include outputting a difference value between an interaction force measured by a haptic sensor and the interaction force.

According to an exemplary embodiment, the method may further include, when the interaction force is greater than or equal to a predetermined magnitude, outputting information indicating this.

According to another aspect of the inventive concept, an interaction force measuring apparatus including: a memory storing instructions; and at least one processor configured to execute the instructions to at least: generate feature maps corresponding to a plurality of sequential images; generate pooling maps corresponding to feature map groups comprising a predetermined number of feature maps among the feature maps; generate attention maps corresponding to the pooling maps; and receive feature maps modified based on the attention maps and output interaction force information.

According to an exemplary embodiment, the pooling maps may include a first type of pooling maps and a second type of pooling maps respectively corresponding to the feature map groups, and the attention maps may include a first type of attention maps respectively corresponding to the first type of pooling maps and a second type of attention maps respectively corresponding to the second type of pooling maps, the processor may be configured to execute the instructions further to: receive at least one of feature maps modified based on the first type of attention maps, feature maps modified based on the second type of attention maps, and a concatenation result of the feature maps modified based on the first type of attention maps and the feature maps modified based on the second type of attention maps, and output the interaction force information.

According to an exemplary embodiment, the first type of pooling map may be generated by performing a convolution operation on a predetermined number of concatenated feature maps with a filter kernel of a predetermined size for each channel, and then linearly combining results of the convolution operation, and the second type of pooling map may be generated by relocating a predetermined number of concatenated feature maps based on a spatial location, performing a convolution operation on the relocated feature maps with a filter kernel of a predetermined size for each channel, and then linearly combining results of the convolution operation.

According to an exemplary embodiment, after the attention maps and corresponding feature maps are multiplied, the feature maps may be modified by adding feature maps to the multiplied result.

According to an exemplary embodiment, the processor may be configured to execute the instructions further to: input the modified feature maps to a recurrent neural network (RNN) in order; input an output value from the RNN to a fully-connected Layer (FCL); and obtain the interaction force information output from the FCL.

According to an exemplary embodiment, the RNN may receive the modified feature maps sequentially from a first feature map to the last feature map and output a first output value corresponding thereto, and receive the modified feature maps sequentially from the last feature map to the first feature map and output a second output value corresponding thereto, and the FCL may receive an average value of the first output value and the second output value.

According to an exemplary embodiment, the predetermined number of feature maps may include a feature map corresponding to a $t^{th}$ image and n−1 feature maps corresponding to n−1 images before the $t^{th}$ image.

According to an exemplary embodiment, the processor may be configured to execute further to: store instructions for outputting a difference value between an interaction force measured by a haptic sensor and the interaction force.

According to an exemplary embodiment, the processor may be configured to execute further to: when the interaction force is greater than or equal to a predetermined magnitude, output information indicating this.

BRIEF DESCRIPTION OF THE DRAWINGS

These and/or other aspects will become apparent and more readily appreciated from the following description of the embodiments, taken in conjunction with the accompanying drawings in which:

FIG. 4A and FIG. 4B are views for describing a method of modifying feature maps according to an embodiment;

DETAILED DESCRIPTION

Figure 1:
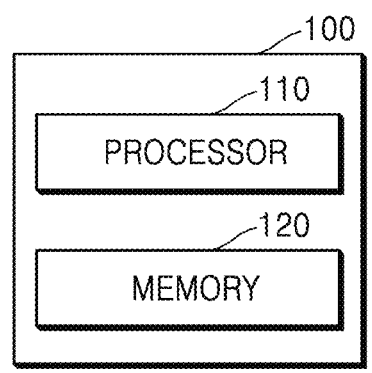
FIG. 1 is a block diagram of a configuration of an interaction force measuring apparatus according to an embodiment.

The present disclosure may be variously modified and have various embodiments, so that specific embodiments will be illustrated in the drawings and described in the detailed description. However, this does not limit the present disclosure to specific embodiments, and it should be understood that the present disclosure covers all the modifications, equivalents and replacements included within the idea and technical scope of the present disclosure.

In describing the present disclosure, in the following description, a detailed explanation of known related technologies may be omitted to avoid unnecessarily obscuring the subject matter of the present disclosure. In addition, numeral figures (for example, 1, 2, and the like) used during describing the disclosure are just identification symbols for distinguishing one element from another element.

Further, in the disclosure, if it is described that one component is "connected" or "accesses" the other component, it is understood that the one component may be directly connected to or may directly access the other component but unless explicitly described to the contrary, another component may be "connected" or "access" between the components.

Moreover, it is intended to clarify that components in the disclosure are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail in order.

FIG. 1 is a block diagram of a configuration of an interaction force measuring apparatus 100 according to an embodiment.

Referring to FIG. 1, the interaction force measuring apparatus 100 may include a processor 110 and a memory 120.

The processor 110 may include at least one processor. In an example, the processor 110 may include a general purpose processor such as CPUs or GPUs. In addition, the processor 110 may include a processor dedicated to a neural network.

The processor 110 may measure an interaction force between objects based on input sequential images. To this end, the processor 110 may measure interaction force information corresponding to the plurality of images by using an artificial intelligence (AI)-based measurement network (not shown, see 200 in FIG. 2). In an example, the processor 110 may input the plurality of images into the measurement network and obtain the interaction force information output from the measurement network.

The memory 120 may include storage.

The memory 120 may store various instructions and data related to the operation of the interaction force measuring apparatus 100. For example, the memory 120, when the processor 110 is executed, may store instructions that perform respective operations of measuring the interaction force using the measurement network, and data associated with the instructions. The memory 120 may store sequential images or the measurement network.

In addition to the above-described configuration, the interaction force measuring apparatus 100 may include various configurations.

The interaction force measuring apparatus 100 may be implemented as one apparatus or may be implemented as a plurality of apparatuses.

The interaction force measuring apparatus 100 may vary. For example, the interaction force measuring apparatus 100 may be an apparatus for controlling a robot. Alternatively, the interaction force measuring apparatus 100 may be a computer.

For ease of explanation, the interaction force measuring apparatus 100 described above will be described below as the apparatus 100.

Figure 2:
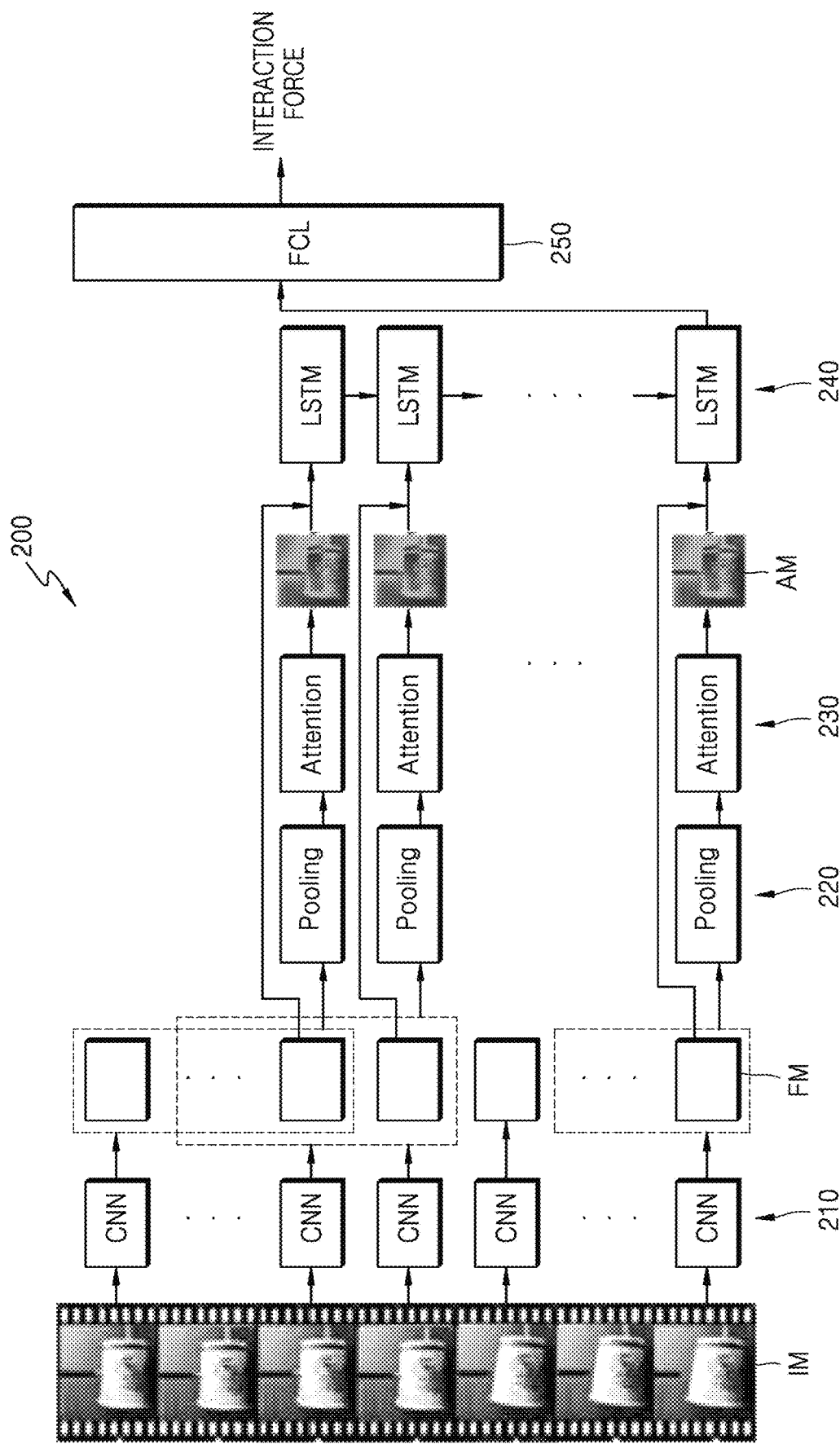
FIG. 2 is a view of a measurement network according to an embodiment.

FIG. 2 is an exemplary view of a measurement network 200 according to an embodiment.

Referring to FIG. 2, the measurement network 200 may include a convolutional neural network (CNN) 210, a pooling layer 220, an attention network 230, a recurrent neural network (RNN) 240, and a fully-connected Layer (FCL) 250.

The CNN 210 may output a feature map FM corresponding to each of input sequential images IM. Here, the plurality of images IM may include an image obtained by continuously photographing predetermined objects in chronological order.

In an embodiment, the CNN 210 may have a structure of a VGG model (see K. Simonyan and A. Zisserman. Very deep convolutional networks for large-scale image recognition. International Conference on Learning Representations, 2015.) or a modified structure of the VGG model.

When the operation of the CNN 210 is called V and a $t^{th}$ image is called $i_t$, a feature vector $x_t$ of the feature map FM may be indicated by $V(i_t)$. $x_t \in \Re^{H \times W \times C}$, where H is height, W is width, and C is the number of channels.

The pooling layer (or pooling network) 220 may output a pooling map corresponding to each feature map group including a predetermined number of feature maps among the plurality of feature maps FM. Each feature map group may include a feature map corresponding to the $t^{th}$ image and n−1 feature maps corresponding to n−1 images before the $t^{th}$ image. That is, each feature map group may include n feature maps.

In an embodiment, the pooling layer 220 may generate a first type of pooling map and a second type of pooling map. The first type of pooling map may be generated for obtaining spatial information, and the second type of pooling map may be generated for obtaining channel information.

In an embodiment, the pooling layer 220 may perform a weighted average pooling operation. The pooling layer 220 may perform the weighted average pooling operation to generate each of the first type of pooling map and the second type of pooling map.

The operation of the pooling layer 220 will be described in more detail with reference to FIG. 3A and FIG. 3B.

Figure 3A:
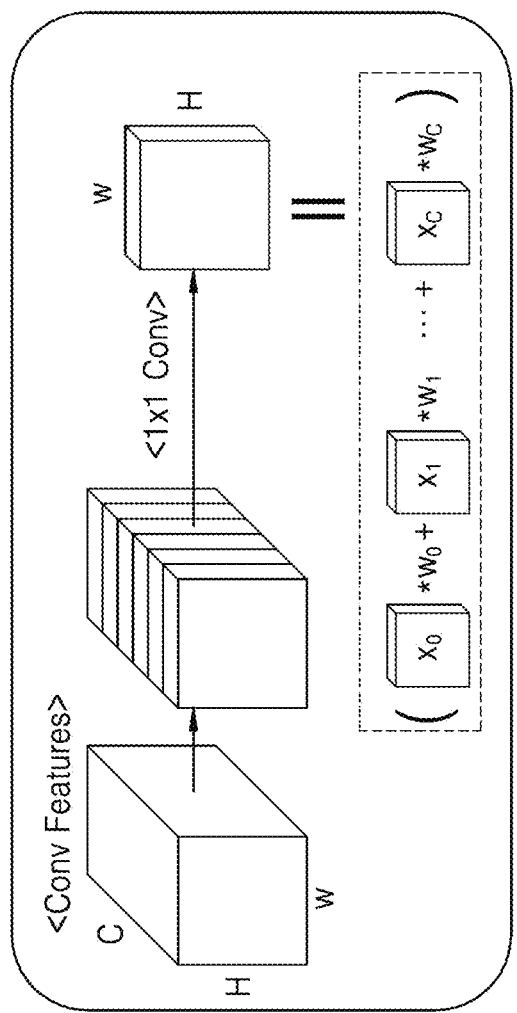
FIG. 3A and FIG. 3B are views for describing a method of generating a first type of pooling map and a second type of pooling map, according to an embodiment.
Figure 3B:
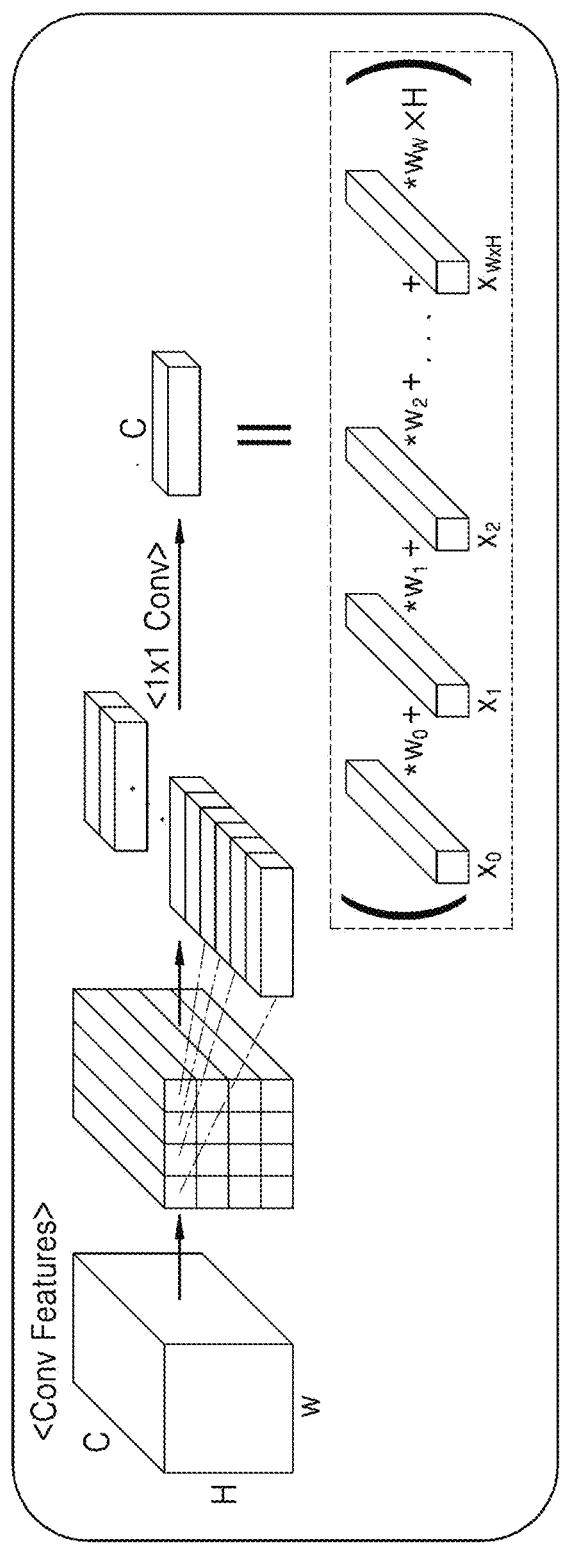

FIG. 3A and FIG. 3B are views for describing a method of generating pooling maps according to an embodiment, wherein FIG. 3A illustrates a method of generating the first type of pooling map, and FIG. 3B illustrates a method of generating the second type of pooling map.

Referring to FIG. 3A, when a feature map matrix X input to the pooling layer 220 is $X \subset \Re^{H \times W \times C}$, X is divided into $\{x_0, x_1, \ldots x_C\}$ ($x \in \Re^{H \times W}$) according to a channel. A weight vector ($\omega \in \Re^C$) is applied to elements of $\{x_0, x_1, \ldots x_C\}$. The application of the weight vector may be simply performed by a convolution operation using a 1×1 filter kernel. That is, the first type of pooling map including spatial information may be generated by convoluting the feature map matrix X for each channel with the filter kernel having a size of 1×1 having w as an element.

Next, referring to FIG. 3B, the feature map matrix X may be relocated to $\Re^{1 \times C \times (H \cdot W)}$ That is, by relocating the feature map matrix based on the spatial position, a feature map matrix having a height of 1, a width of C, and the number of channels of H×W may be obtained. The relocated X is divided into $\{x_0, x_1, \ldots x_{H \times W}\}$ according to the channel. A weight vector w is applied to elements of $\{x_0, x_1, \ldots x_{H \times W}\}$. The application of the weight vector may be simply performed by a convolution operation using the 1×1 filter kernel. That is, the second type of pooling map including channel information may be generated by convoluting the relocated feature map matrix X for each channel with the filter kernel having a size of 1×1 having w as an element.

In general, global average pooling based on a single image has been used in various studies. However, since the inventive concept of the disclosure uses a plurality of sequential images, the amount of data may be reduced by generating the first type of pooling map for obtaining spatial information and the second type of pooling map for obtaining channel information from a plurality of feature maps corresponding to a plurality of images, and information needed to measure an interaction force may be effectively extracted.

Referring again to FIG. 2, the attention network 230 may generate a plurality of attention maps AM respectively corresponding to a plurality of pooling maps. At least some of the plurality of feature maps FM may be modified based on the plurality of attention maps AM. As described above, since each of the pooling maps is generated based on several feature maps, each of the attention maps may also be generated by reflecting dynamic information of various feature maps.

The attention network 230 may generate a first type of attention maps corresponding to a first type of pooling maps and a second type of attention maps corresponding to a second type of pooling maps.

The feature maps may be modified based on the first type of attention maps respectively corresponding to the first type of pooling maps, or based on the second type of attention maps respectively corresponding to the second type of pooling maps.

The plurality of modified feature maps may be sequentially input to the RNN 240, and an output value of the RNN 240 may be input to the FCL 250. An interaction force may be output from the FCL 250.

The RNN 240 may include a long short-term memory (LSTM). A continuous LSTM model is used to solve many sequential problems. The LSTM processes input data in a hidden state.

A plurality of feature maps are sequentially input to the LSTM. An output value output from the LSTM corresponding to a first feature map is transmitted to the LSTM receiving a second feature map. That is, since the output value of the LSTM in the previous operation is input to the LSTM in the next operation, time series features of the plurality of feature maps may be extracted.

In an embodiment, the LSTM may be bidirectional LSTM. The bidirectional LSTM may receive the input in two directions. One may be a direction from the first feature map (past) to the last feature map (future) of the plurality of feature maps, and the other may be a direction from the last feature map (future) to the first feature map (past) of the plurality of feature maps. When the feature maps are input in two directions of the bidirectional LSTM, two outputs output from the last LSTM are combined and then input to the FCL 250.

The RNN 240 may receive at least one of feature maps modified based on the first type of attention maps, feature maps modified based on the second type of attention maps, and a concatenation result of the feature maps modified based on the first type of attention maps and the feature maps modified based on the second type of attention maps, and may output an output value corresponding thereto.

In more detail, when the feature maps modified based on the first type of attention maps are input to the RNN 240, a one-dimensional vector output from the RNN 240 is input to the FCL 250, and correspondingly, interaction force information is output from the FCL 250. Also, when the feature maps modified based on the second type of attention maps are input to the RNN 240, the one-dimensional vector output from the RNN 240 is input to the FCL 250, and correspondingly, interaction force information is output from the FCL 250. In addition, when the concatenation result of the feature maps modified based on the first type of attention maps and the feature maps modified based on the second type of attention maps is input to the RNN 240, the one-dimensional vector output from the RNN 240 is input to the FCL 250, and correspondingly, interaction force information is output from the FCL 250.

Hereinafter, a method of modifying a plurality of feature maps based on the first type of attention maps and the second type of attention maps will be described with reference to FIG. 4A and FIG. 4B.

FIG. 4A and FIG. 4B are views for describing a method of modifying feature maps according to an embodiment.

FIG. 4A illustrates a method of modifying feature maps based on the first type of attention maps, and FIG. 4B illustrates a method of modifying feature maps based on the second type of attention maps.

As described above, interaction between objects occurs in the area where contact is made. Therefore, when measuring an interaction force based on the whole image, the optimal result may not be obtained.

Thus, in an embodiment of the disclosure, a salient region in the image may be identified, and the feature maps may be modified based on the identified salient region.

First, reference is made to FIG. 4A.

When a feature map of a $k^{th}$ image is $X_k \in \Re^{H \times W \times C}$, a feature map group including a feature map of the $t^{th}$ image and n−1 feature maps before the $t^{th}$ image may be indicated by Xin=[X(t−n+1), . . . , Xt]($X_{tn} \in \Re^{H \times W \times nC}$). $X_{tn}$ is concatenated n feature maps.

The first type of pooling map $Y_s$ ($Y_s \in \Re^{H \times W}$) generated from $X_{tn}$ may be calculated by Equation 1 below.

$$Y_s = \omega_s * X_{tn} \qquad \text{[Equation 1]}$$

In Equation 1, * indicates a convolution operation, and $w_s$ is a filter kernel ($\omega_s \in \Re^{1 \times 1 \times C}$) having a size of 1×1. Element $y_{i,j}$ of Y is a linear combination of element values of channels corresponding to a spatial position (i, j).

A feature map $X'_t$ ($X'_t \in \Re^{H^* \times W \times C}$) of the $t^{th}$ image modified from the feature map of the $t^{th}$ image may be indicated by Equation 2 below.

$$X'_t = M_s(X_{tn}) \otimes X_t + X_t \qquad \text{[Equation 2]}$$

In Equation 2, $\otimes$ is a multiplication operation on an element basis. In addition, $M_s$ ($M_s \in \Re^{H \times W \times 1}$) is $M_s = \sigma(W*Y+b)$ as an attention map of a continuous space. Y is the first type of pooling map corresponding to $X_{tn}$, which is convolved with a filter kernel W and a bias b is added. σ is a sigmoid operation.

Next, reference is made to FIG. 4B.

Xtn=[X(t−n+1), . . . , Xt], which is a feature map group including n feature maps, is input to Equation 3 below.

$$X'_t = M_c(X_{tn}) \otimes X_t + X_t \qquad \text{[Equation 3]}$$

In Equation 3, $X'_t$ ($X'_t \in \Re^{H^* \times W \times C}$) indicates a feature map modified from the feature map corresponding to the $t^{th}$ image, $M_c$ ($M_c \in \Re^{1 \times 1 \times C}$) is an attention map of a continuous channel, $M_c = \sigma(F_1(F_0(Y_c)))$. $Y_c$ ($Y_c \in \Re^{1 \times 1 \times C}$) is the second type of pooling map corresponding to $X_{tn}$, which is indicated by Equation 4 below. $Y_c$ is processed in two multilayer perceptron layers and the sigmoid operation is performed. $F_0 \in \Re^{nC/r \times C}$ and $F_1 \in \Re^{nC \times nC/r}$. $F_0$ and $F_1$ are parameter weights of the multilayer perceptron, and r is a reduction ratio.

$$Y_c = \omega_c * X'_{tn} \qquad \text{[Equation 4]}$$

In Equation 4, $X'_{tn}$ indicates a feature map group relocated by the method described in FIG. 3B, and $w_c$ is a filter kernel ($\omega_c \in \Re^{1 \times 1 \times (H \cdot W)}$) having a size of 1×1. Element $y_k$ of $Y_c$ indicates a linear combination of element values of all spatial positions of channel k.

Figure 5:
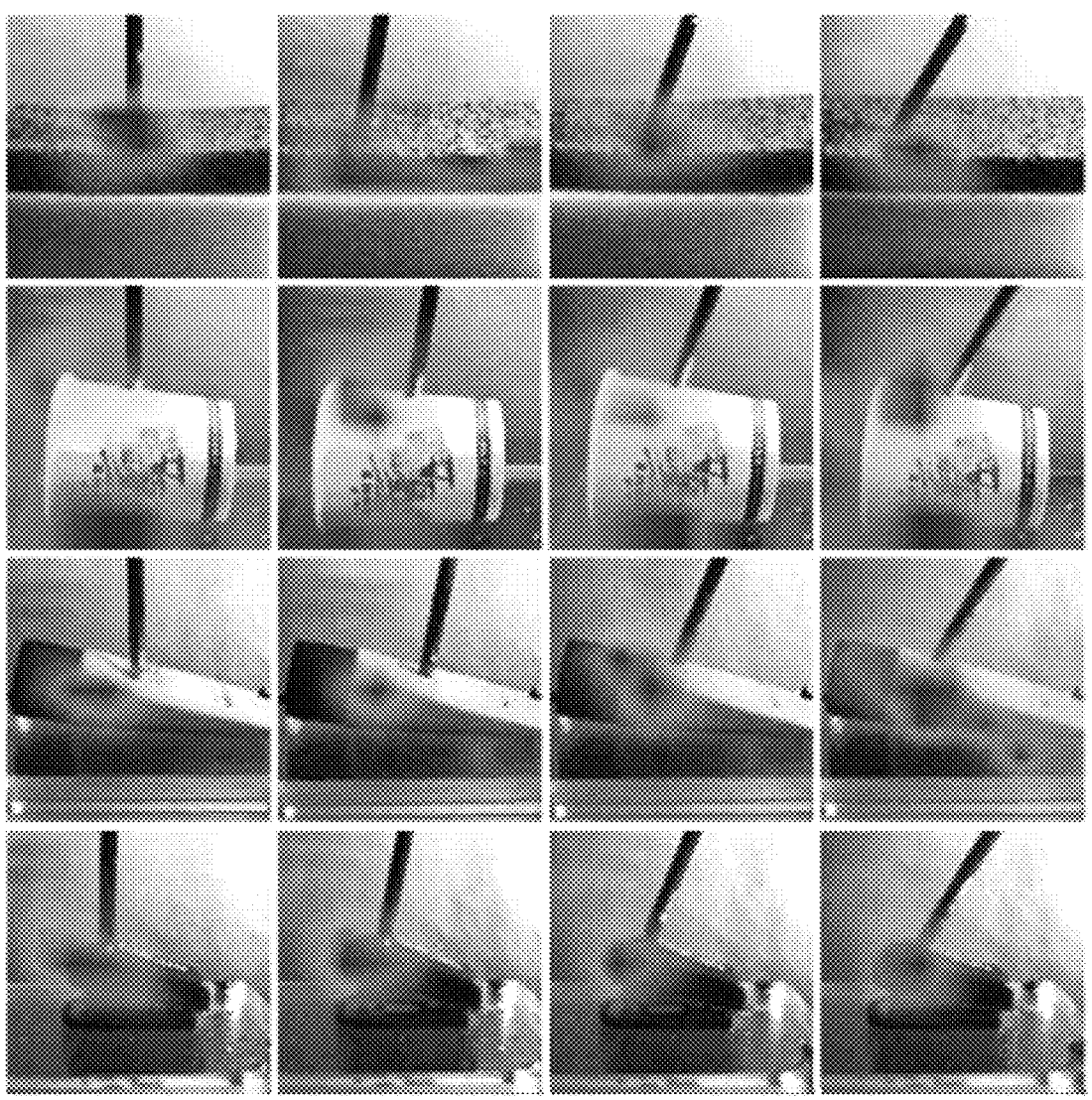
FIG. 5 is a view of attention maps generated according to an embodiment.

FIG. 5 is a prediction diagram illustrating attention maps generated according to an embodiment.

As described above, a salient region in an image may be identified through an attention map, thereby enabling accurate measurement of an interaction force.

Figure 6:
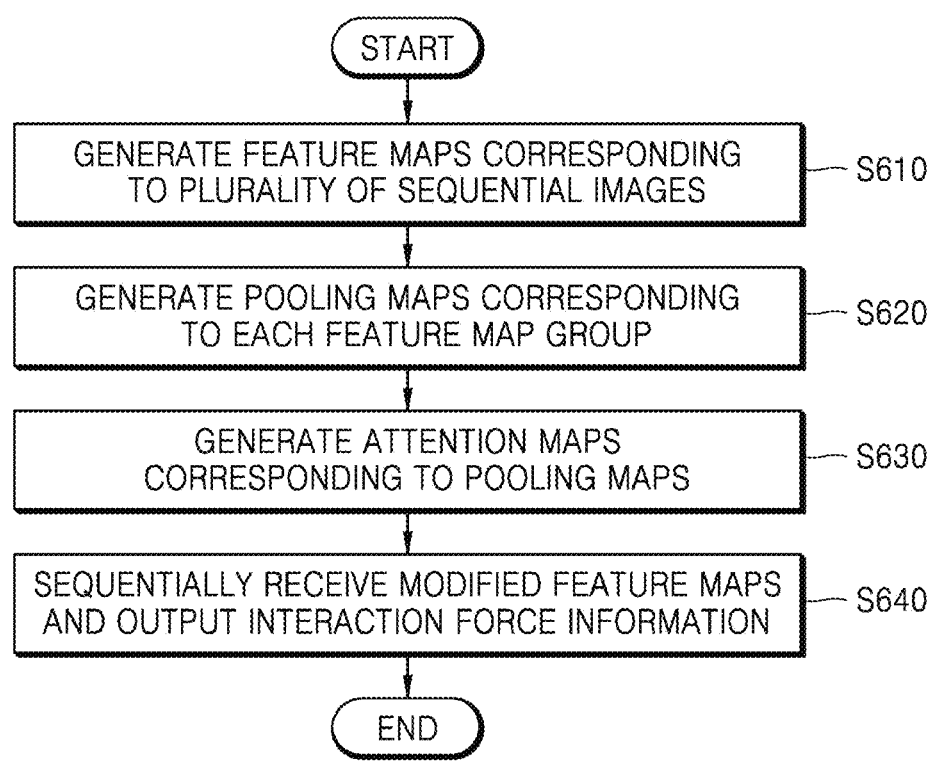
FIG. 6 is a flowchart illustrating a method of measuring an interaction force according to an embodiment.

FIG. 6 is a flowchart illustrating a method of measuring an interaction force according to an embodiment.

In operation S610, the apparatus 100 generates feature maps corresponding to a plurality of sequential images. The apparatus 100 may input the plurality of sequential images to the CNN 210 and obtain feature maps output from the CNN 210.

The apparatus 100 may obtain a plurality of images stored in the memory 120. Alternatively, the apparatus 100 may obtain a plurality of images from an external device through a network.

In operation S620, the apparatus 100 generates pooling maps respectively corresponding to feature map groups including a predetermined number of feature maps among the feature maps.

The apparatus 100 may generate the pooling maps using the pooling layer 220. The pooling maps may include a first type of pooling map and a second type of pooling map.

In operation S630, the apparatus 100 generates attention maps corresponding to the pooling maps. The apparatus 100 may generate attention maps using the attention network 230. The attention maps may include a first type of attention map and a second type of attention map.

In operation S640, the apparatus 100 sequentially receives feature maps modified based on the attention maps and outputs interaction force information.

The apparatus 100 may sequentially input the modified feature maps to the RNN 240, input a value output from the RNN 240 to the FCL 250, and obtain interaction force information output from the FCL 250.

According to an embodiment, the apparatus 100 may output a difference value between an interaction force measured by a haptic sensor and an interaction force measured based on the plurality of sequential images. In more detail, the apparatus 100 may detect whether an abnormality has occurred in the haptic sensor by comparing the interaction force measured by the haptic sensor mounted on a robot with the interaction force measured based on the plurality of images, and may output results of the detection through speakers, monitors, etc.

In addition, when the interaction force measured based on the plurality of images is greater than or equal to a predetermined magnitude, the apparatus 100 may output information indicating this. In more detail, the apparatus 100 measures an interaction force applied to a patient during a medical procedure based on the plurality of sequential images, and may output information indicating that an accident may occur through a speaker or a monitor when the measured interaction force is greater than or equal to a predetermined magnitude.

Meanwhile, the method described with reference to FIG. 6 includes one or more operations or actions for achieving the method described above. The operations and/or actions for achieving the methods may be interchanged with one another without departing from the scope of the claims. In other words, the order and/or use of specific operations and/or actions may be modified without departing from the scope of the claims, unless a predetermined order for the operations and/or actions is specified.

In addition, the method described with reference to FIG. 6 may be implemented as a computer program recorded on a computer-readable recording medium written to perform each operation.

The computer program, in order for the computer to read a program and to execute the methods implemented by the program, may include code coded in a computer language such as C, C++, JAVA, machine language, etc., which can be read by the processor (CPU) of the computer through a device interface of the computer. Such code may include functional code associated with a function or the like that defines the necessary functions for executing the methods, and may include execution procedure related control code necessary for the processor of the computer to execute the functions according to a predetermined procedure. Furthermore, corresponding code may further include memory reference related code with respect to whether additional information required for performing the above-described functions by the processor of the computer or media needs to be referred to where (address) in an internal or external memory of the computer. In addition, when the processor of the computer needs to communicate with another remote computer or server in order to execute the functions, the code may further include communication-related code, such as how to communicate with another remote computer or server using a communication module of the computer, and what information or media should be transmitted and received during communication.

The stored medium refers to a medium that stores data semi-permanently and can be read by a device, not a medium that stores data for a short time such as a register, a cache, a memory, and the like. In more detail, examples of the storage medium include, but are not limited to, ROM, RAM, CD-ROM, a magnetic tape, a floppy disk, an optical data storage device, and the like. That is, the program may be stored in various recording media on various servers to which the computer can access or various recording media on the computer of a user. Also, the medium may also be distributed over network coupled computer systems so that the computer-readable code may be stored in a distributive manner.

According to embodiments of the disclosure, an interaction force between objects may be measured only with sequential images.

In addition, according to embodiments of the disclosure, the interaction force may be accurately measured only on a salient region in sequential images through an attention network.

Furthermore, according to embodiments of the disclosure, effective control of a robot is possible by measuring an interaction force generated when the robot interacts with an object.

Effects obtained by the method and apparatus for measuring an interaction force according to the technical idea of the disclosure are not limited to the above-mentioned effects, and other effects not mentioned are described in the technical field of the disclosure.

Numerous modifications and adaptations will be readily apparent to one of ordinary skill in the art without departing from the spirit and scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the spirit and scope of the following claims.

What is claimed is:

1. A method of measuring an interaction force, the method comprising:
   generating feature maps corresponding to a plurality of sequential images;

generating pooling maps respectively corresponding to feature map groups including a predetermined number of feature maps among the feature maps;

generating attention maps corresponding to the pooling maps; and sequentially receiving feature maps modified based on the attention maps and outputting interaction force information, wherein the pooling maps comprise a first type of pooling maps and a second type of pooling maps respectively corresponding to the feature map groups, wherein the attention maps comprise a first type of attention maps respectively corresponding to the first type of pooling maps and a second type of attention maps respectively corresponding to the second type of pooling maps, and wherein the outputting of the interaction force information comprises:

receiving at least one of feature maps modified based on the first type of attention maps, feature maps modified based on the second type of attention maps, and a concatenation result of the feature maps modified based on the first type of attention maps and the feature maps modified based on the second type of attention maps, and outputting the interaction force information.

2. The method of claim 1, wherein the first type of pooling map is generated by performing a convolution operation on a predetermined number of concatenated feature maps with a filter kernel of a predetermined size for each channel, and then linearly combining results of the convolution operation, and the second type of pooling map is generated by relocating a predetermined number of concatenated feature maps based on a spatial location, performing a convolution operation on the relocated feature maps with a filter kernel of a predetermined size for each channel, and then linearly combining results of the convolution operation.

3. The method of claim 1, wherein, after the attention maps and corresponding feature maps are multiplied, the feature maps are modified by adding feature maps to the multiplied result.

4. The method of claim 1, wherein the outputting of the interaction force information comprises:

inputting the modified feature maps to a recurrent neural network (RNN) in order; and obtaining the interaction force information output from a fully connected layer (FCL) by inputting an output value of the RNN to the FCL.

5. The method of claim 4, wherein the RNN receives the modified feature maps sequentially from a first feature map to the last feature map and outputs a first output value corresponding thereto, and receives the modified feature maps sequentially from the last feature map to the first feature map and outputs a second output value corresponding thereto, and the FCL receives an average value of the first output value and the second output value.

6. The method of claim 1, wherein the predetermined number of feature maps comprise a feature map corresponding to a $t^{th}$ image and n−1 feature maps corresponding to n−1 images before the $t^{th}$ image.

7. The method of claim 1, further comprising:

outputting a difference value between an interaction force measured by a haptic sensor and the interaction force.

8. The method of claim 1, further comprising:

when the interaction force is greater than or equal to a predetermined magnitude, outputting information indicating this.

9. An interaction force measuring apparatus comprising:

a memory storing instructions; and at least one processor configured to execute the instructions to at least:

generate feature maps corresponding to a plurality of sequential images;

generate pooling maps corresponding to feature map groups comprising a predetermined number of feature maps among the feature maps;

generate attention maps corresponding to the pooling maps; and receive feature maps modified based on the attention maps and output interaction force information, wherein the pooling maps comprise a first type of pooling maps and a second type of pooling maps respectively corresponding to the feature map groups, wherein the attention maps comprise a first type of attention maps respectively corresponding to the first type of pooling maps and a second type of attention maps respectively corresponding to the second type of pooling maps, and wherein the processor is configured to execute the instructions further to:

receive at least one of feature maps modified based on the first type of attention maps, feature maps modified based on the second type of attention maps, and a concatenation result of the feature maps modified based on the first type of attention maps and the feature maps modified based on the second type of attention maps, and output the interaction force information.

10. The interaction force measuring apparatus of claim 9, wherein the first type of pooling map is generated by performing a convolution operation on a predetermined number of concatenated feature maps with a filter kernel of a predetermined size for each channel, and then linearly combining results of the convolution operation, and the second type of pooling map is generated by relocating a predetermined number of concatenated feature maps based on a spatial location, performing a convolution operation on the relocated feature maps with a filter kernel of a predetermined size for each channel, and then linearly combining results of the convolution operation.

11. The interaction force measuring apparatus of claim 9, wherein, after the attention maps and corresponding feature maps are multiplied, the feature maps are modified by adding feature maps to the multiplied result.

12. The interaction force measuring apparatus of claim 9, wherein the processor is configured to execute the instructions further to:

input the modified feature maps to a recurrent neural network (RNN) in order;

input an output value from the RNN to a fully-connected Layer (FCL); and obtain the interaction force information output from the FCL.

13. The interaction force measuring apparatus of claim 12, wherein the RNN receives the modified feature maps sequentially from a first feature map to the last feature map and outputs a first output value corresponding thereto, and receives the modified feature maps sequentially from the last feature map to the first feature map and outputs a second output value corresponding thereto, and the FCL receives an average value of the first output value and the second output value.

14. The interaction force measuring apparatus of claim 9, wherein the predetermined number of feature maps comprise a feature map corresponding to a $t^{th}$ image and n−1 feature maps corresponding to n−1 images before the $t^{th}$ image.

15. The interaction force measuring apparatus of claim 9, wherein the processor is configured to execute further to:
 store instructions for outputting a difference value between an interaction force measured by a haptic sensor and the interaction force.

16. The interaction force measuring apparatus of claim 9, wherein the processor is configured to execute further to:
 when the interaction force is greater than or equal to a predetermined magnitude, output information indicating that the interaction force is greater than or equal to the predetermined magnitude.

* * * * *